United States Patent
Wang

(10) Patent No.: US 11,376,497 B2
(45) Date of Patent: Jul. 5, 2022

(54) OBJECT DISPLAY METHOD AND APPARATUS, AND STORAGE MEDIUM

(71) Applicant: Tencent Technology (Shenzhen) Company Limited, Shenzhen (CN)

(72) Inventor: Yiran Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 85 days.

(21) Appl. No.: 16/751,065

(22) Filed: Jan. 23, 2020

(65) Prior Publication Data

US 2020/0155930 A1 May 21, 2020

Related U.S. Application Data

(63) Continuation of application No. PCT/CN2018/096001, filed on Jul. 17, 2018.

(30) Foreign Application Priority Data

Jul. 27, 2017 (CN) .......................... 201710627213.0

(51) Int. Cl.
  *A63F 13/25* (2014.01)
  *A63F 13/537* (2014.01)
  *A63F 13/58* (2014.01)

(52) U.S. Cl.
  CPC ............ *A63F 13/25* (2014.09); *A63F 13/537* (2014.09); *A63F 13/58* (2014.09)

(58) Field of Classification Search
  CPC ......... A63F 13/25; A63F 13/537; A63F 13/58
  See application file for complete search history.

(56) References Cited

U.S. PATENT DOCUMENTS

2003/0216177 A1   11/2003   Aonuma et al.
2015/0258441 A1*  9/2015   Borodovsky ....... A63F 13/2145
                                                           463/31

FOREIGN PATENT DOCUMENTS

CN   101022867 A   8/2007
CN   102479023 A   5/2012
(Continued)

OTHER PUBLICATIONS

Dota2—Wikipedia.pdf, https://en.wikipedia.org/w/index.php?title=Dota_2&oldid=720226177, published May 14, 2016, last accessed Jul. 9, 2021 (Year: 2016).*

(Continued)

*Primary Examiner* — Yingchuan Zhang
(74) *Attorney, Agent, or Firm* — Morgan, Lewis & Bockius LLP

(57) ABSTRACT

This application discloses an object display method and apparatus, and a storage medium. The method includes: obtaining, by using a client of a game application, first target movement information of a first member object participating in a current game event, the first member object including at least one other object that is in the same camp as a target object, the target object being an object used by the client of the game application in the current game event, and the first target movement information including at least a moving direction of the first member object; and displaying, in the client of the game application, the first target movement information of the first member object. This application resolves the technical problem of the display operations being excessively complex that exists in the object display method currently used in the related art.

17 Claims, 4 Drawing Sheets

(56) References Cited

FOREIGN PATENT DOCUMENTS

| | | |
|---|---|---|
| CN | 104740876 A | 7/2015 |
| CN | 105335064 A | 2/2016 |
| CN | 106528032 A | 3/2017 |
| CN | 106730827 A | 5/2017 |
| CN | 107441705 A | 12/2017 |
| EP | 0830879 A2 | 3/1998 |
| JP | 2016123479 A | 7/2016 |

OTHER PUBLICATIONS

Vincent Le, The Art of Warding. An Advanced Guide to Warding_by Vincent Le_Dota 2 Notes_Medium.pdf, published on Feb. 4, 2014 (Year: 2014).*

Hinduscholar, TIP_Enabling Hero Icon on Minimap.pdf, published on Aug. 10, 2014 (Year: 2014).*

Gamestar: "Dota 2—Test / Review zum MOBA-Spiel von Valve (Gameplay)", Jan. 19, 2013, XP055781095, Retrieved from the Internet: https://www.youtube.com/watch?v=xs4QQ_8an7Y.

Extended European Search Report, EP18838756.7, dated Mar. 11, 2021, 11 pgs.

Tencent Technology, ISRWO, PCT/CN2018/096001, Oct. 19, 2018, 7 pages.

Tencent Technology, IPRP, PCT/CN2018/096001, Jan. 28, 2020, 6 pages.

\* cited by examiner

OBJECT DISPLAY METHOD AND APPARATUS, AND STORAGE MEDIUM

CROSS-REFERENCE TO RELATED APPLICATIONS

This application is a continuation application of PCT/CN2018/096001, entitled "OBJECT DISPLAY METHOD AND APPARATUS, AND STORAGE MEDIUM" filed on Jul. 17, 2018, which claims priority to Chinese Patent Application No. 201710627213.0, entitled "OBJECT DISPLAY METHOD AND APPARATUS, AND STORAGE MEDIUM" filed on Jul. 27, 2017, both of which are incorporated by reference in their entirety.

FIELD OF THE TECHNOLOGY

This application relates to the field of computers, and specifically, to an object display method and apparatus, and a storage medium.

BACKGROUND OF THE DISCLOSURE

Nowadays, more and more users start to download multiplayer online battle arena games (MOBA games for short) applications by using terminals, and participate in MOBA games with other players.

Currently, in an MOBA game application, member objects participating in the game are usually in a moving state. Therefore, in order to obtain a location of a friendly member object, due to restriction of a terminal screen, a player usually needs to repeatedly perform operations such as dragging and view switching multiple times to observe the moving status of the friendly member object, so as to obtain a next moving direction of the friendly member object, and further determine an advancing strategy of the current ongoing game. That is, a problem that display operation is excessively complex exists in the object display method used in related game applications.

Currently, there is no effective solution to the foregoing problem.

SUMMARY

Embodiments of this application provide an object display method and apparatus, and a storage medium, to resolve at least the technical problem of the display operations being excessively complex that exists in the object display method currently used in the related art.

According to an aspect of the embodiments of this application, an object display method is performed at a computing device having one or more processors and memory storing a plurality of programs to be executed by the one or more processors, the method including: obtaining, by using a client of a game application, first target movement information of a first member object participating in a current game event, the first member object including at least one other object that is in the same camp as a target object, the target object being an object used by the client of the game application in the current game event, and the first target movement information including at least a moving direction of the first member object; and displaying, in the client of the game application, the first target movement information of the first member object.

According to another aspect of the embodiments of this application, a computing device is further provided, the computing device having one or more processors, memory coupled to the one or more processors and a plurality of programs stored in the memory that, when executed by the one or more processors, cause the computing device to perform the aforementioned object display method.

According to another aspect of the embodiments of this application, a non-transitory computer readable storage medium is further provided, the storage medium storing a plurality of machine readable instructions in connection with a computing device having one or more processors, wherein the plurality of machine readable instructions, when executed by the one or more processors, cause the computing device to perform the aforementioned object display method.

According to another aspect of the embodiments of this application, an electronic apparatus is further provided, the electronic apparatus including a memory, a processor, and a computer program stored on the memory and capable of being run on the processor, the processor performing the object display method by using the computer program.

In the embodiments of this application, first target movement information of a first member object participating in a current game event is obtained by using a client of a game application, the first member object includes at least one other object that is in the same camp as a target object, and the target object is an object used by the client of the game application in the current game event; the first target movement information includes at least a moving direction of the first member object; and then the first target movement information of the first member object is displayed in the client of the game application. That is, the first target movement information including the moving direction of the first member object is directly displayed in the client of the game application, to implement quick obtaining of a next moving strategy of the first member object without repeatedly performing operations such as dragging and view switching multiple times, so as to simplify moving operations of displaying the first target movement information of the first member object and further resolve the technical problem of the display operations being excessively complex that exists in the object display method currently used in the related art.

BRIEF DESCRIPTION OF THE DRAWINGS

The accompanying drawings described herein are intended to provide further understanding of this application and constitute a part of this application. Exemplary embodiments of this application and the description thereof are used for explaining this application rather than constituting the improper limitation to this application. In the accompanying drawings.

DESCRIPTION OF EMBODIMENTS

To make a person skilled in the art understand the solutions in this application better, the following describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts fall within the protection scope of this application.

The terms such as "first" and "second" in this specification, the claims, and the foregoing accompanying drawings of this application are intended to distinguish between similar objects rather than describe a particular sequence or a chronological order. It is understood that the data termed in such a way are interchangeable in proper circumstances, so that the embodiments of this application described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
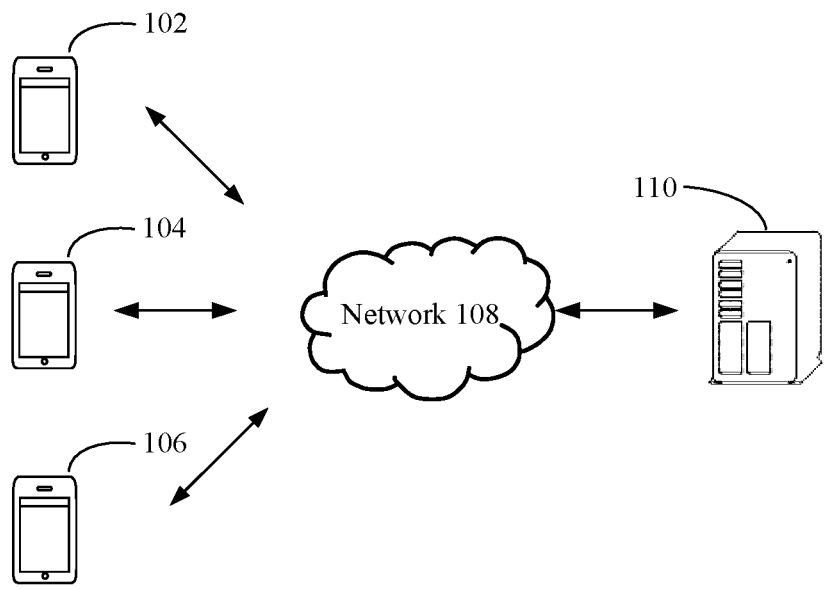
FIG. 1 is a schematic diagram of an application scenario according to an embodiment of this application.

In the embodiments of this application, an embodiment of the foregoing object display method is provided as an optional implementation. The object display method may be applied in an application environment shown in FIG. 1, but this is not limited thereto. The application environment includes a server 101 and a plurality of terminals. For example, the plurality of terminals are a terminal 102, a terminal 104, and a terminal 106, respectively. The terminal 102, the terminal 104, and the terminal 106 are each installed with a client of a multiplayer online battle arena game (MOBA game for short) application. The terminal 102, the terminal 104, and the terminal 106 are connected to an application server 110 of the MOBA game application through a network 108, and each obtain first target movement information of a first member object participating in a current game event by using the installed client of the game application and display, in the client of the game application, the first target movement information of the first member object. The first member object includes at least one other object that is in the same camp as a target object, the target object is an object used by the client of the game application in the current game event, and the first member object may further includes the target object. The first target movement information includes at least a moving direction of the first member object.

When the terminal 102, the terminal 104, or the terminal 106 obtains the first target movement information of the first member object by using the client of the game application, the terminal 102, the terminal 104, or the terminal 106 may first obtain, by using the client of the game application, movement information of member objects participating in the current game event, where the member objects include a first member object and a second member object, and the first member object and the second member object are opposing objects in the current game event, and obtain the first target movement information matching the first member object from the movement information.

In this embodiment, the foregoing terminal may include but is not limited to, at least one of the following: a mobile phone, a tablet computer, a notebook computer, a desktop PC, a digital television, and other hardware devices configured to display an object in a game application. The foregoing network may include but is not limited to at least one of the following: a wide area network, a metropolitan area network, or a local area network. The foregoing is merely exemplary, and no limitation is set in this embodiment.

Figure 2:
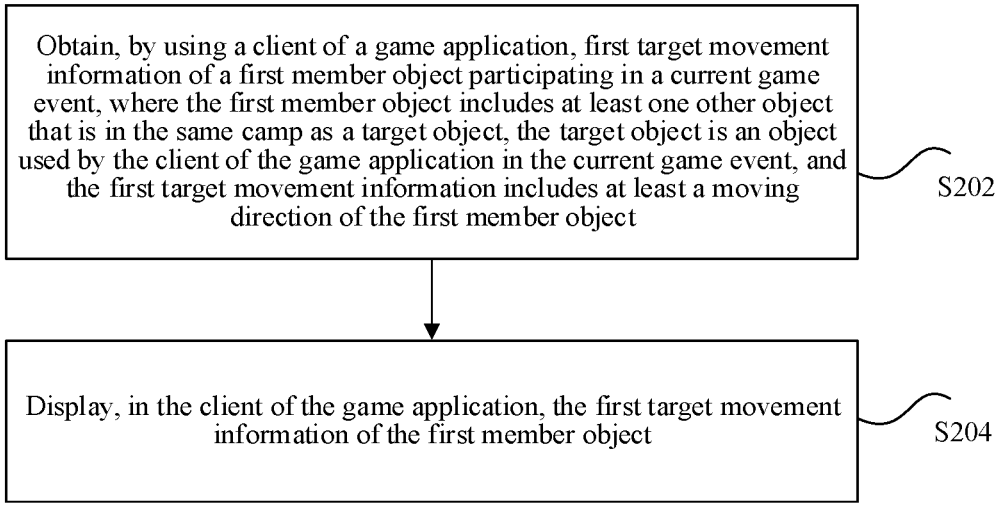
FIG. 2 is a schematic diagram of an optional object display method according to an embodiment of this application.

According to an embodiment of this application, an object display method is provided. As shown in FIG. 2, the method includes the following steps:

S202. Obtain, by using a client of a game application, first target movement information of a first member object participating in a current game event, where the first member object includes at least one other object that is in the same camp as a target object, the target object is an object used by the client of the game application in the current game event, and the first target movement information includes at least a moving direction of the first member object.

S204. Display, in the client of the game application, the first target movement information of the first member object.

Optionally, the game application may include but is not limited to a multiplayer online battle arena game (MOBA game for short) application, which is referred to as an MOBA game application hereinafter for ease of description. The game application is configured to display a moving location and a moving direction of an ally in the same camp, to obtain a next moving direction of a friendly member object, and further determine an advancing strategy of the current ongoing game. An application used to display a moving location and a moving direction of an object in a game application falls within the protection scope of the embodiments of this application.

In this embodiment, the first target movement information including the moving direction of the first member object is directly displayed in the client of the game application, to implement quick obtaining of a next moving strategy of the first member object without repeatedly performing operations such as dragging and view switching multiple times, so as to simplify moving operations of displaying the first target movement information of the first member object and further resolve the technical problem of the display operations being excessively complex that exists in the object display method currently used in the related art.

Optionally, when obtaining the first target movement information of the first member object participating in the current game event by using the client of the game application, in a possible implementation, by using the client of the game application, movement information of a member object participating in the current game event is obtained, and the first target movement information matching the first member object is obtained from the movement information. The member object includes but is not limited to a first member object and a second member object, where the first member object may include but is not limited to one or more member objects, and the second member object may include but is not limited to one or more member objects. A relationship between a plurality of member objects that are all in the same camp (for example, all in the first member object, or all in the second member object) may be but is not limited to a cooperative relationship that helps each other, and a relationship between member objects that are in different camps may be but is not limited to a hostile relationship that conflict against each other. The number of the member objects may be determined according to, but not limited to, game configuration information such as scene settings and game modes of the game application.

Optionally, when obtaining the first target movement information of the first member object participating in the current game event by using the client of the game application, in a possible implementation, a server of the game application issues, by using the game application, the first target movement information of the first member object participating in the current game event to the terminal, and the terminal receives, by using the client of the game application, the first target movement information of the first member object participating in the current game event issued by the server. The server of the game application issues, once detecting that the movement information of the first member object changes, the first target movement information of the first member object by using the client of the game application.

Optionally, the first member object further includes the target object. The displaying, in the client of the game application, the first target movement information of the first member object includes but is not limited to: displaying the first target movement information of the target object in a first display mode; and displaying the first target movement information of the another object among the first member objects in a second display mode. Display markers of the first display mode and the second display mode are different.

For example, assuming that the current terminal is installed with a client of an MOBA game application, in a case in which the object currently used in the client of the MOBA game application is a target object A, after obtaining the movement information, the step may be but is not limited to displaying first target movement information of the target object in a first display mode and displaying first target movement information of an object B that is also a first member object in a second display mode, where display markers of the two display modes are different. For example, if the display markers are colors, the first target movement information of different objects may be displayed in a differentiated manner by using differentiated display colors. For example, the first target movement information of the target object is displayed in green and the first target movement information of the another object among the first member objects is displayed in blue, so as to distinguish the target object and the another object. In addition, if the display markers are shapes, icons of different shapes may be used for distinguishing. For example, the first target movement information of the target object is configured in a pentagon and the first target movement information of the another object is configured in a circle. The foregoing is merely an example, and no limitation is set herein.

Optionally, the obtaining the first target movement information matching the first member object from the movement information includes but is not limited to: obtaining an object ID of the first member object, and identifying the first target movement information matching the first member object from the movement information according to the object ID. In this embodiment, the method may be but is not limited to distinguishing camps in which the objects used by different game accounts are in the game application by using object IDs.

Optionally, the first target movement information further includes: a coordinate location of a first member object, and the displaying, in the client of the game application, the first target movement information of the first member object includes but is not limited to: displaying a map corresponding to the current game event on the client of the game application; and displaying, according to the coordinate location of the first member object, a first avatar ID of the first member object on the map, where a location of the first avatar ID on the map corresponds to a location of the first member object in a game scene corresponding to the map, and the first avatar ID is configured with a first direction marker indicating the moving direction of the first member object.

In this embodiment, the interactive interface in the client of the game application may display, but not limited to, a map corresponding to the current game event of the game application. The map may be, but not limited to, always displayed on the interactive interface of the client of the game application, and the display scale is reduced. In addition, the map may also be, but not limited to, invoked and displayed on the interactive interface after a trigger button is tapped. The display method is merely an example, and no limitation is set in this embodiment. In addition, in this embodiment, the member object may display, but not limited to, the avatar ID on the map. A display area of the map is limited, and the first member object and the second member object may mark, but not limited to, locations on the map using the respective corresponding avatar IDs according to the respective current coordinate locations. In addition, the avatar ID may further be configured with, but not limited to, a corresponding direction marker according to a moving direction of the member object, for example, a directional arrow or the like corresponding to the moving direction of the object may be added on the avatar ID.

In this embodiment, the interactive interface includes an image of a game scene and an operation interface displayed to the user. The interactive interface includes the map and the like, and the game scene is an image corresponding to the map and used to display, to the user, corresponding details and environment of the map. Moreover, the map is displayed at any location on the interactive interface. In order not to affect an operation of the user, the map may be displayed at a corner of the interactive interface. For example, the map is displayed at an upper left corner, an upper right corner, a lower left corner, or a lower right corner of the interactive interface.

Optionally, the method further includes: obtaining permission information configured for the target object in the current game event; obtaining, in a case in which the permission information indicates that the target object possesses a first permission, second target movement information matching at least one second member object, where the second target movement information includes at least a moving direction of the second member object; and displaying, in the client of the game application, the second target movement information of the second member object.

The first permission is a permission able to obtain movement information of an opposite member. Moreover, the obtaining permission information configured for the target object in the current game event may be before the obtaining, by using the client of the game application, the first target movement information of the first member object participating in the current game event, or may be after the obtaining, by using the client of the game application, the first target movement information of the first member object participating in the current game event. In addition, when obtaining the second target movement information matching at least one second member object, the second target movement information matching at least one second member object may be obtained, by obtaining, by using the client of the game application, movement information of member objects participating in the current game event, from the movement information, and the second target movement information matching at least one second member object may also be directly received from the server by using the client of the game application.

In a specific application scenario, for every game account in a game, the first target movement information of the first member object is displayed and the second target movement information is hidden or partially hidden, to ensure fairness of the game, but this is not limited thereto. However after being configured with a specific ability, the target object may obtain a specific permission and may implement a purpose of displaying the second target movement information of the second member object in a short time, so as to increase a win rate of a camp in which the target object is. For example, in a case in which the permission information indicating that the target object is configured with the first permission in the current game event is obtained, the client in which the target object is displays the second target movement information of the second member object as an enemy within a predefined period of time while displaying the first target movement information of the first member object.

Optionally, the second target movement information further includes a coordinate location of the second member object. The displaying, in the client of the game application, the second target movement information of the second member object includes but is not limited to: displaying, in the client of the game application, a map corresponding to the current game event; and displaying, according to the coordinate location of the second member object, a second avatar ID of the second member object on the map, where a location of the second avatar ID on the map corresponds to a location of the second member object in a game scene corresponding to the map, the second avatar ID is configured with a second direction marker indicating the moving direction of the second member object, and a display time of the second direction marker in the current game event is shorter than a predefined threshold.

Optionally, before the obtaining, by using a client of a game application, first target movement information of a first member object, the method further includes but is not limited to: detecting, in the client of the game application, movement information of the target object; and reporting the movement information of the target object to a server of the game application, so that the server of the game application transmits the movement information to the first member object participating in the current game event. The server of the game application may transmit the movement information to the first member object participating in the current game event, and may also transmit the movement information to both the first member object and the second member object.

In this embodiment, the first target movement information including the moving direction of the first member object is directly displayed in the client of the game application, to implement quick obtaining of a next moving strategy of the first member object without repeatedly performing operations such as dragging and view switching multiple times, so as to simplify moving operations of displaying the first target movement information of the first member object and further resolve the technical problem of the display operations being excessively complex that exists in the object display method currently used in the related art.

As an optional technical solution, the displaying, in the client of the game application, the first target movement information of the first member object includes but is not limited to the following steps:

S1. When the first member object further includes the target object, display the first target movement information of the target object in a first display mode.

S2. Display the first target movement information of the another object among the first member objects in a second display mode, where display markers of the first display mode and the second display mode are different.

In a specific application scenario, using a game application as an example, the first target movement information of the target object is displayed in the first display mode. The first display mode may be but is not limited to displaying, on a map displayed in an interactive interface of the game application, an avatar ID of the target object by using a first display marker. For example, the color of the first display marker is set to a first color. In addition, the first display marker is further configured with a moving direction of the target object. The first target movement information of the target object is displayed in the second display mode. The second display mode may be but is not limited to displaying, on the map displayed in an interactive interface of the game application, an avatar ID of the target object by using a second display marker. For example, the color of the second display marker is set to a second color. In addition, the second display marker is further configured with a moving direction of the target object, so as to distinguish the target object and the another object.

In this application, the first target movement information of the target object is displayed in the first display mode and the first target movement information of the another object among the first member objects is displayed in the second display mode, to distinguish the target object and the another object on the map and clearly and directly distinguish moving locations and moving directions of different second member objects, so as to quickly distinguish all the member objects of the first member objects, thereby improving a display efficiency to advance the game.

As an optional technical solution, the obtaining the first target movement information matching the first member object from the movement information includes but is not limited to the following steps:

S1. Obtain an object ID of the first member object.

The object ID of the first member object is obtained and the object ID used to uniquely identify each member object in the game application may include but is not limited to: a game account ID used in the game application and IDs (Play ID) used in the game application such as a game virtual character ID.

S2. Identify, according to the object ID, the first target movement information matching the first member object from the movement information.

In a specific application scenario, using a game application as an example for description, a client of the game application in a mobile terminal receives movement information of all member objects transmitted by a server of the game application. After receiving the movement information transmitted by the server of the game application, objects that are the first member objects are distinguished and identified according to the object ID, for displaying the first target movement information of the first member object. The first target movement information includes at least a moving direction of the first member object; and the first target movement information may further include a coordinate location of the first member object.

In this embodiment, the first target movement information matching the first member objects is identified from the movement information according to the object ID to distinguish member groups, so as to quickly and directly display the first target movement information of the first member object in an interactive interface of the client of the game application to simplify a display step and improve a display efficiency, to further determine a next moving strategy of another member object among the first member objects according to the first target movement information, thereby increasing a win rate against the second member object.

As an optional technical solution, the displaying, in the client of the game application, the first target movement information of the first member object includes but is not limited to the following steps:

S1. Display, in the client of the game application, a map corresponding to the current game event.

S2. Display, according to the coordinate location of the first member object, a first avatar ID of the first member object on the map, where a location of the first avatar ID on the map corresponds to a location of the first member object in a game scene corresponding to the map, and the first avatar ID is configured with a first direction marker indicating the moving direction of the first member object.

Figure 3:
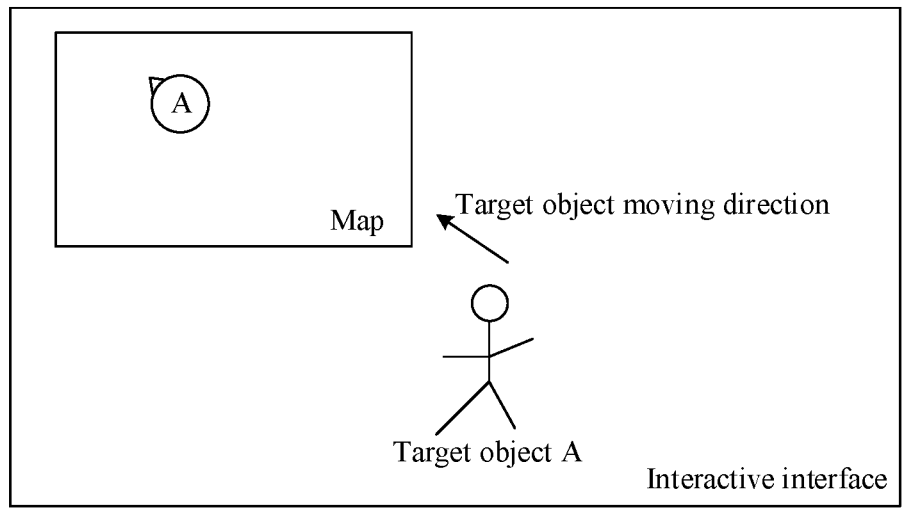
FIG. 3 is a schematic diagram of a game application interface according to an embodiment of this application.

In a specific application scenario, using an MOBA game application installed on a mobile terminal as an example for description, FIG. 3 is a schematic diagram of an interactive interface of an MOBA game application. The interactive interface displays a map interface and an interactive interface of the current game event. For the convenience of description, this embodiment describes the map interface and the interactive interface of the game application, and does not describe an operation panel of the game application. A small window at the upper left corner of the interactive interface displays the map interface, used to display a map corresponding to the current game event and display an avatar ID of the first member object on the map according to coordinates of a location of a target object A. The target object A, as shown in the map in FIG. 3, is displayed as a circular ID on the map. The circular ID is configured with a first direction marker used to indicate a moving direction of the target object A, and a location of the avatar ID of the target object A on the map corresponds to the location of the target object A in a game scene corresponding to the map. In the game scene of the game application, the moving direction of the target object A (for ease of description, a pointing direction of an arrow is set to the moving direction of the object A, and in a real application scenario, there is not an arrow for indicating the moving direction of the target object) consistent with the moving direction of the avatar ID of the target object A on the map.

In this embodiment, the map corresponding to the current game event is displayed in the client of the game application, and the first avatar ID of the first member object is displayed on the map, to quickly determine an advancing strategy of the member object in the current game event by displaying the movement information of the member object on the map, thereby further achieving an effect of improving a user's game experience.

As an optional technical solution, the method includes the following steps:

S1. Obtain permission information configured for the target object in the current game event; and obtain, in a case in which the permission information indicates that the target object possesses a first permission, second target movement information matching at least one second member object, where the second target movement information includes at least a moving direction of the second member object.

The obtaining permission information configured for the target object in the current game event may be after the obtaining the first target movement information matching the first member object, or may be before the obtaining the first target movement information matching the first member object. In the embodiments of this application, an execution order of the obtaining permission information configured for the target object in the current game event and the obtaining the first target movement information matching the first member object is not specifically limited.

When obtaining the second target movement information, the second target movement information matching at least one second member object may be obtained, by obtaining, by using the client of the game application, movement information of member objects participating in the current game event, from the movement information. The second target movement information matching at least one second member object may also be directly received from the server by using the client of the game application.

S2. Display, in the client of the game application, the second target movement information of the second member object.

When displaying, in the client of the game application, the first target movement information of the first member object, the second target movement information of the second member object is displayed in the client of the game application.

Figure 4:
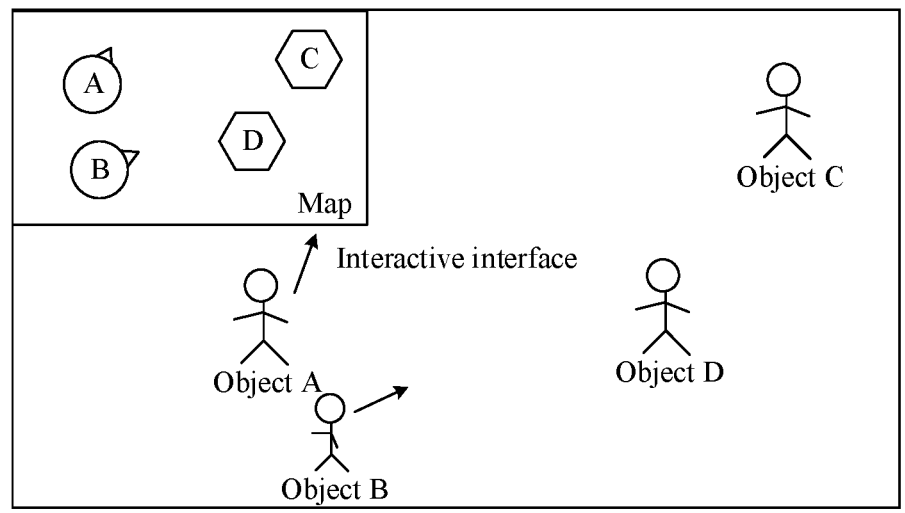
FIG. 4 is a schematic diagram of another game application interface according to an embodiment of this application.

In a specific application scenario, using an MOBA game application installed on a mobile terminal as an example for description, FIG. 4 is a schematic diagram of an interactive interface of an MOBA game application. It is assumed that an object A and an object B are the first member objects, and an object C and an object D are the second member objects. The map may directly display avatar IDs of the object A and the object B that are the first member objects, and the avatar IDs are configured with direction markers. For the object C and the object D that are the second member objects, only avatar IDs used to mark locations are displayed, but this is not limited thereto. In a scenario shown in FIG. 4, since the object A and the object B that are the first member objects are opposing member objects of the object C and the object D that are the second member objects, the corresponding moving directions are not displayed on the avatar IDs on the map.

Further, it is assumed that, in a case in which the permission information configured for the target object A indicates that the target object A possesses the first permission, the second target movement information matching at least one second member object is obtained from the movement information. For example, the movement information of the object C is obtained. Specifically, a location of the avatar ID of the object C and a moving direction of the object C are displayed on the map of the target object A.

The second target movement information of the second member object is displayed in the client of the game application, as shown in FIG. 4, IDs of the object C and the object D of the second member objects on the map are set to be pentagons, and moving direction markers are configured at one ends of the pentagons. The foregoing is merely an example, and this embodiment is not limited thereto.

In this embodiment, the permission information configured for the target object in the current game event is obtained. In a case in which the permission information indicates that the target object possesses a first permission, the second target movement information matching at least one second member object is obtained from the movement information, so that the moving location and the moving direction of the second member object may also be displayed to the target object within a predefined period of time while the moving direction of the first member object is displayed.

As an optional technical solution, the displaying, in the client of the game application, the second target movement information of the second member object includes but is not limited to the following steps:

S1. Display, in the client of the game application, a map corresponding to the current game event.

S2. Display, according to the coordinate location of the second member object, a second avatar ID of the second member object on the map, where a location of the second avatar ID on the map corresponds to a location of the second member object in a game scene corresponding to the map, the second avatar ID is configured with a second direction marker indicating the moving direction of the second member object, and a display time of the second direction marker in the current game event is shorter than a predefined threshold.

Figure 5:
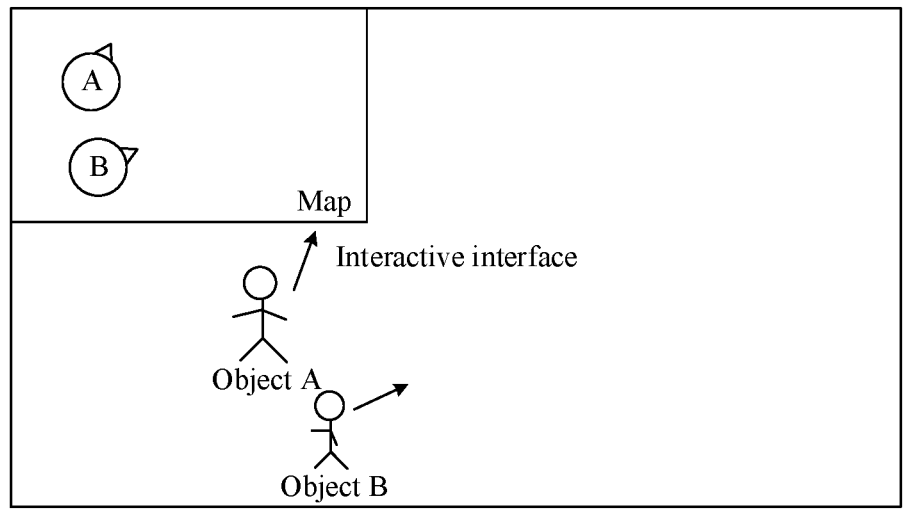
FIG. 5 is a first schematic diagram 1 of still another game application interface according to an embodiment of this application.
Figure 6:
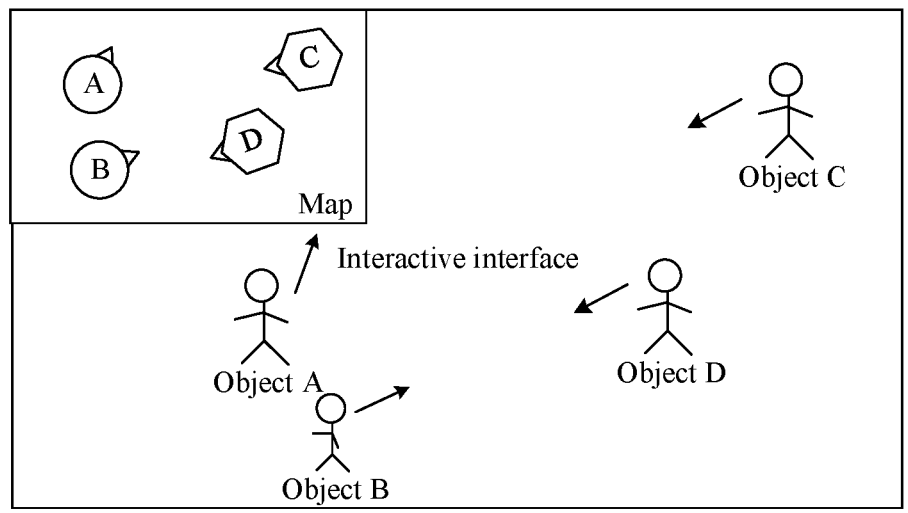
FIG. 6 is a second schematic diagram 2 of yet still another game application interface according to an embodiment of this application.

Still using an MOBA game application installed on a mobile terminal as an example for description, FIG. 5 is a schematic diagram of an interactive interface of the MOBA game application. An object A and an object B are the first member objects. Generally, second member objects exist outside a predefined range of view of the first member objects in which the object A and the object B are. The second member objects include an object C and an object D. Because the object C and the object D are located outside the predefined range of view of the object A and the object B, the object C and the object D are not displayed to the object A and the object B, and users corresponding to the object A and the object B cannot obtain locations and moving directions of the objects C and D from the map on an application interface. As shown in FIG. 6, the second target movement information matching at least one second member object is obtained from the movement information. For example, after the target object A triggers a predefined condition (for example, after a game character represented by the target object A casts an ability, or the object C and/or the object D moves into the range of view of the target object A), the movement information of the object C and the object D is obtained. Specifically, locations of avatar IDs of the object C and the object D and moving directions of the object C and the object D are displayed on the map of the target object A. A display time for displaying the second direction markers of the object C and the object D in the client of the target object A in the current game event is less than a predefined threshold. For example, after an object in the MOBA game application uses a corresponding ability, a location and a moving direction of an enemy object are obtained and then displayed on the client of the game application.

In this embodiment, the map corresponding to the current game event is displayed in the client of the game application, and a second avatar ID of the second member object is displayed on the map, so that the moving location and the moving direction of the second member object may also be displayed to the target object within a predefined period of time while the moving direction of the first member object is displayed. An increased game win rate is obtained while the display steps are simplified.

As an optional technical solution, before the obtaining, by using a client of a game application, first target movement information of a first member object participating in a current game event, the method further includes but is not limited to the following steps:

S1. Detect, in the client of the game application, movement information of the target object.

S2. Report the movement information of the target object to a server of the game application, so that the server of the game application transmits the movement information to the first member object participating in the current game event.

The server of the game application may transmit the movement information to the first member object, and may also transmit to both the first member object and the second member object.

Still using an MOBA game application installed on a mobile terminal as an example for description, the movement information of the target object is detected in the client of the game application and is reported to the server of the game application. After receiving the movement information reported by all clients, the server of the game application collects the movement information and transmits the collected movement information to the clients of the game application of the member objects participating in the current game event. After receiving the movement information transmitted by the server, the clients of the game application update maps.

In this embodiment, the movement information of the target object is detected in the client of the game application, and the movement information of the target object is reported to the server of the game application, so that the server of the game application transmits the movement information to the member objects participating in the current game event, thereby being capable of displaying the movement information of all the member objects for a member object participating in the current game event, so as to improve user experience.

For ease of description, each of the foregoing method embodiments is described as a series of action combinations. However, it is to be appreciated by a person skilled in the art that this application is not limited to the described order of the actions because some steps may be performed in other orders or simultaneously according to this application. In addition, it is to be understood by a person skilled in the art that the related actions and modules are not necessarily required in some embodiments.

According to the foregoing descriptions of implementations, the person skilled in the art may clearly know that the method according to the foregoing embodiments may be implemented by using software and a necessary general hardware platform, or certainly may be implemented by using hardware. However, in most cases, the former is a preferred implementation. Based on the understanding, the technical solutions of this application, or the part contributing to the related art, may essentially be presented in the form of a software product. The computer software product is stored in a storage medium (for example, an ROM/RAM, a magnetic disk, or an optical disc) including several instructions to enable a terminal device (which may be a mobile phone, a computer, a server, a network device, or the like) to perform the methods described in the embodiments of this application.

Figure 7:
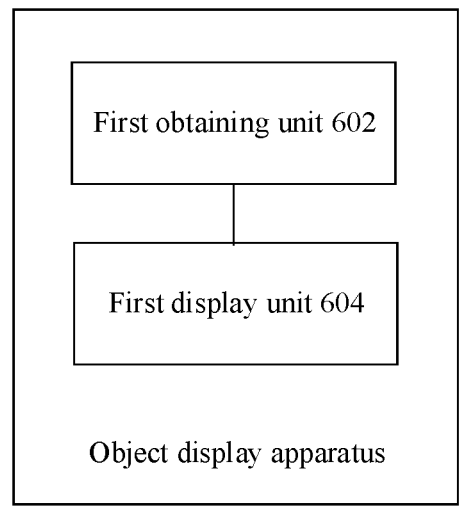
FIG. 7 is a schematic structural diagram of an optional object display apparatus according to an embodiment of this application.

According to this embodiment of this application, an object display apparatus configured to perform the foregoing object display method is further provided. As shown in FIG. 7, the apparatus includes:

1) a first obtaining unit 602, configured to obtain, by using a client of a game application, first target movement information of a first member object participating in a current game event, the first member object including at least one other object that is in the same camp as the target object, the target object being an object used by the client of the game application in the current game event, and the first target movement information including at least a moving direction of the first member object; and 2) a first display unit 604, configured to display, in the client of the game application, the first target movement information of the first member object.

Optionally, the game application may include but is not limited to a multiplayer online battle arena game (MOBA game for short) application, which is referred to as an MOBA game application hereinafter for ease of description. The MOBA game application is configured to display a moving location and a moving direction of an ally, to obtain a next moving direction of a friendly member object, and further determine an advancing strategy of the current ongoing game. An application used to display a moving location and a moving direction of an object in a game application falls within the protection scope of the embodiments of this application.

In this embodiment, the first target movement information including the moving direction of the first member object is directly displayed in the client of the game application, to implement quick obtaining of a next moving strategy of the first member object without repeatedly performing operations such as dragging and view switching multiple times, so as to simplify moving operations of displaying the first target movement information of the first member object and further resolve the technical problem of the display operations being excessively complex that exists in the object display method currently used in the related art.

Optionally, the first obtaining unit 602 includes:

a first obtaining module, configured to obtain, by using the client of the game application, movement information of member objects participating in the current game event, where the member objects include the first member object and a second member object, and the first member object and the second member object are opposing objects in the current game event; and a second obtaining module, configured to obtain, from the movement information, first target movement information matching the first member object.

The movement information of the member objects participating in the current game event is obtained, and the member objects include but are not limited to a first member object and a second member object, where the first member object may include but is not limited to one or more member objects, and the second member object may include but is not limited to one or more member objects. A relationship between a plurality of member objects that are all in the same camp (for example, all in the first member object, or all in the second member object) may be but is not limited to a cooperative relationship that helps each other, and a relationship between member objects that are in different camps may be but is not limited to a hostile relationship that conflict against each other. The number of the member objects may be determined according to, but not limited to, game configuration information such as scene settings and game modes of the game application.

Optionally, the displaying, in the client of the game application, the first target movement information of the first member object includes but is not limited to: displaying the first target movement information of the first member object in a first display mode and displaying the first target movement information of the another object among the first member objects in a second display mode, where display markers of the first display mode and the second display mode are different.

For example, assuming that the current terminal is installed with a client of an MOBA game application, in a case in which the object currently used in the client of the MOBA game application is a target object A, after obtaining the movement information, the step may be but is not limited to displaying first target movement information of the target object in a first display mode and displaying first target movement information of an object B that is also a first member object in a second display mode, where display markers of the two display modes are different. For example, if the display markers are colors, the first target movement information of different objects may be displayed in a differentiated manner by using differentiated display colors. For example, the first target movement information of the target object is displayed in green and the first target movement information of the another object among the first member objects is displayed in blue, so as to distinguish the target object and the another object. In addition, if the display markers are shapes, icons of different shapes may be used for distinguishing. For example, the first target movement information of the target object is configured in a pentagon and the first target movement information of the another object is configured in a circle. The foregoing is merely an example, and no limitation is set herein.

Optionally, the obtaining the first target movement information matching the first member object from the movement information includes but is not limited to: obtaining an object ID of the first member object; and identifying the first target movement information matching the first member object from the movement information according to the object ID, where the first target movement information further includes: a coordinate location of a first member object. In this embodiment, the method may be but is not limited to distinguishing camps in which the objects used by different game accounts are in the game application by using object IDs.

Optionally, the displaying, in the client of the game application, the first target movement information of the first member object includes but is not limited to: displaying, in the client of the game application, a map corresponding to the current game event; and displaying, according to the coordinate location of the first member object, a first avatar ID of the first member object on the map, where a location of the first avatar ID on the map corresponds to a location of the first member object in a game scene corresponding to the map, and the first avatar ID is configured with a first direction marker indicating the moving direction of the first member object.

In this embodiment, the interactive interface in the client of the game application may display, but not limited to, a map corresponding to the current game event of the game application. The map may be, but not limited to, always displayed on the interactive interface of the client of the game application, and the display scale is reduced. In addition, the map may also be, but not limited to, invoked and displayed on the interactive interface after a trigger button is tapped. The display method is merely an example, and no limitation is set in this embodiment. In addition, in this embodiment, the member object may display, but not limited to, the avatar ID on the map. A display area of the map is limited, and the first member object and the second member object may mark, but not limited to, locations on the map using the respective corresponding avatar IDs according to the respective current coordinate locations. In addition, the avatar ID may further be configured with, but not limited to, a corresponding direction marker according to a moving direction of the member object, for example, a directional arrow or the like corresponding to the moving direction of the object may be added on the avatar ID.

In this embodiment, the interactive interface includes an image of a game scene and an operation interface displayed to the user. The interactive interface includes the map and the like, and the game scene is an image corresponding to the map and used to display, to the user, corresponding details and environment of the map.

Optionally, the method further includes but is not limited to: obtaining permission information configured for the target object in the current game event is included; and obtaining, in a case in which the permission information indicates that the target object possesses a first permission, second target movement information matching at least one second member object, where the second target movement information includes at least a moving direction of the second member object; and displaying, in the client of the game application, the second target movement information of the second member object.

In a specific application scenario, for every game account in a game, the first target movement information of the first member object is displayed and the second target movement information is hidden or partially hidden, to ensure a fairness of the game, but this is not limited thereto. However after being configured with a specific ability, the target object may obtain a specific permission and may implement a purpose of displaying the second target movement information of the second member object in a short time, so as to increase a win rate of a camp in which the target object is. For example, in a case in which the permission information indicating that the target object is configured with the first permission in the current game event is obtained, the client in which the target object is displays the second target movement information of the second member object as an enemy within a pre-defined period of time while displaying the first target movement information of the first member object.

Optionally, before the obtaining, by using a client of a game application, first target movement information of a first member object, the method further includes but is not limited to: detecting, in the client of the game application, movement information of the target object; and reporting the movement information of the target object to a server of the game application, so that the server of the game application transmits the movement information to the first member object participating in the current game event.

In this embodiment, the first target movement information including the moving direction of the first member object is directly displayed in the client of the game application, to implement quick obtaining of a next moving strategy of the first member object without repeatedly performing operations such as dragging and view switching multiple times, so as to simplify moving operations of displaying the first target movement information of the first member object and further resolve the technical problem of the display operations being excessively complex that exists in the object display method currently used in the related art.

As an optional technical solution, the first member object further includes the target object, and the first display unit 604 includes:

1) a first display module, configured to display the first target movement information of the target object in a first display mode; and 2) a second display module, configured to display the first target movement information of the another object among the first member objects in a second display mode, where display markers of the first display mode and the second display mode are different.

In a specific application scenario, using a game application as an example, an object ID of the first member object is obtained and the object ID used to uniquely identify each member object in the game application may include but is not limited to: a game account ID used in the game application and IDs (Play ID) used in the game application such as a game virtual character ID. In a case in which the object ID indicates that the current object is the target object, the method may include but is not limited to displaying the first target movement information of the target object in the first display mode. The first display mode may be but is not limited to displaying, on a map displayed in an interactive interface of the game application, an avatar ID of the target object by using a first display marker. For example, the color of the first display marker is set to a first color. In addition, the first display marker is further configured with a moving direction of the target object. In a case in which the object ID indicates that the current object is another object rather than the target object among the first member objects, the method may include but is not limited to: displaying the first target movement information of the target object in the second display mode. The second display mode may be but is not limited to displaying, on the map displayed in an interactive interface of the game application, an avatar ID of the target object by using a second display marker. For example, the color of the second display marker is set to a second color. In addition, the second display marker is further configured with a moving direction of the target object, so as to distinguish the target object and the another object.

In this application, the first target movement information of the target object is displayed in the first display mode and the first target movement information of the another object among the first member objects is displayed in the second display mode, to distinguish the target object and the another object on the map and clearly and directly distinguish moving locations and moving directions of different second member objects, so as to quickly distinguish all the member objects of the first member objects, thereby improving a display efficiency to advance the game.

As an optional technical solution, the second obtaining module is further configured to obtain an object ID of the first member object, and according to the object ID, identify the first target movement information matching the first member object from the movement information.

In a specific application scenario, using a game application as an example for description, a client of the game application in a mobile terminal receives movement information of all member objects transmitted by a server of the game application. After receiving the movement information transmitted by the server of the game application, objects that are the first member objects are distinguished and identified according to the object ID, for displaying the first target movement information of the first member object. The first target movement information includes at least a moving direction of the first member object and a coordinate location of the first member object.

In this embodiment, the first target movement information matching the first member objects is identified from the movement information according to the object ID to distinguish member groups, so as to quickly and directly display the first target movement information of the first member object in an interactive interface of the client of the game application to simplify a display step and improve a display efficiency, to further determine a next moving strategy of another member object among the first member objects according to the first target movement information, thereby increasing a win rate against the second member object.

As an optional technical solution, the first target movement information further includes: a coordinate location of the first member object, and the first display unit 604 includes:

1) a third display module, configured to display, in the client of the game application, a map corresponding to the current game event; and 2) a fourth display module, configured to display, according to the coordinate location of the first member object, a first avatar ID of the first member object on the map, where a location of the first avatar ID on the map corresponds to a location of the first member object in a game scene corresponding to the map, and the first avatar ID is configured with a first direction marker indicating the moving direction of the first member object.

In a specific application scenario, using an MOBA game application installed on a mobile terminal as an example for description, FIG. 3 is a schematic diagram of an interactive interface of an MOBA game application. The interactive interface displays a map interface and an interactive interface of the current game event. For the convenience of description, this embodiment describes the map interface and the interactive interface of the game application, and does not describe an operation panel of the game application. A small window at the upper left corner of the interactive interface displays the map interface, used to display a map corresponding to the current game event and display an avatar ID of the first member object on the map according to coordinates of a location of a target object A. The target object A, as shown in the map in FIG. 3, is displayed as a circular ID on the map. The circular ID is configured with a first direction marker used to indicate a moving direction of the target object A, and a location of the avatar ID of the target object A on the map corresponds to the location of the target object A in a game scene corresponding to the map. In the game scene of the game application, the moving direction of the target object A (for ease of description, a pointing direction of an arrow is set to the moving direction of the object A, and in a real application scenario, there is not an arrow for indicating the moving direction of the target object) consistent with the moving direction of the avatar ID of the target object A on the map.

In this embodiment, the map corresponding to the current game event is displayed in the client of the game application, and the first avatar ID of the first member object is displayed on the map, to quickly determine an advancing strategy of the member object in the current game event by displaying the movement information of the member object on the map, thereby further achieving an effect of improving a user's game experience.

As an optional technical solution, the apparatus further includes:

1) a second obtaining unit, configured to obtain permission information configured for the target object in the current game event;

a third obtaining unit, configured to obtain second target movement information matching at least one second member object, where the second target movement information includes at least a moving direction of the second member object; and 2) a second display unit, configured to display, in the client of the game application, the second target movement information of the second member object.

In a specific application scenario, using an MOBA game application installed on a mobile terminal as an example for description, FIG. 4 is a schematic diagram of an interactive interface of an MOBA game application. It is assumed that an object A and an object B are the first member objects, and an object C and an object D are the second member objects. The map may directly display avatar IDs of the object A and the object B that are the first member objects, and the avatar IDs are configured with direction markers. For the object C and the object D that are the second member objects, only avatar IDs used to mark locations are displayed, but this is not limited thereto. In a scenario shown in FIG. 4, since the object A and the object D that are the first member objects are opposing member objects of the object C and the object D that are the second member objects, the corresponding moving directions are not displayed on the avatar IDs on the map.

Further, it is assumed that, in a case in which the permission information configured for the target object A indicates that the target object A possesses the first permission, the second target movement information matching at least one second member object is obtained from the movement information. For example, the movement information of the object C is obtained. Specifically, a location of the avatar ID of the object C and a moving direction of the object C are displayed on the map of the target object A.

The second target movement information of the second member object is displayed in the client of the game application, as shown in FIG. 4, IDs of the object C and the object D of the second member objects on the map are set to be pentagons, and moving direction markers are configured at one ends of the pentagons. The foregoing is merely an example, and this embodiment is not limited thereto.

In this embodiment, the permission information configured for the target object in the current game event is obtained. In a case in which the permission information indicates that the target object possesses a first permission, the second target movement information matching at least one second member object is obtained from the movement information, so that the moving location and the moving direction of the second member object may also be displayed to the target object within a predefined period of time while the moving direction of the first member object is displayed.

As an optional technical solution, the second target movement information further includes: a coordinate location of the second member object, and the second display unit includes:

1) a fifth display module, configured to display, in the client of the game application, a map corresponding to the current game event; and 2) a sixth display module, configured to display, according to the coordinate location of the second member object, a second avatar ID of the second member object on the map, where a location of the second avatar ID on the map corresponds to a location of the second member object in a game scene corresponding to the map, the second avatar ID is configured with a second direction marker indicating the moving direction of the second member object, and a display time of the second direction marker in the current game event is shorter than a predefined threshold.

Still using an MOBA game application installed on a mobile terminal as an example for description, FIG. 5 is a schematic diagram of an interactive interface of the MOBA game application. An object A and an object B are the first member objects. Generally, second member objects exist outside a predefined range of view of the first member objects in which the object A and the object B are. The second member objects include an object C and an object D.

Because the object C and the object D are located outside the predefined range of view of the object A and the object B, the object C and the object D are not displayed to the object A and the object B, and users corresponding to the object A and the object B cannot obtain locations and moving directions of the objects C and D from the map on an application interface. As shown in FIG. 6, the second target movement information matching at least one second member object is obtained from the movement information. For example, after the target object A triggers a predefined condition (for example, after a game character represented by the target object A casts an ability, or the object C and/or the object D moves into the range of view of the target object A), the movement information of the object C and the object D is obtained. Specifically, locations of avatar IDs of the object C and the object D and moving directions of the object C and the object D are displayed on the map of the target object A. A display time for displaying the second direction markers of the object C and the object D in the client of the target object A in the current game event is less than a predefined threshold. For example, after an object in the MOBA game application uses a corresponding ability, a location and a moving direction of an enemy object are obtained and then displayed on the client of the game application.

In this embodiment, the map corresponding to the current game event is displayed in the client of the game application, and a second avatar ID of the second member object is displayed on the map, so that the moving location and the moving direction of the second member object may also be displayed to the target object within a predefined period of time while the moving direction of the first member object is displayed. An increased game win rate is obtained while the display steps are simplified.

As an optional technical solution, the apparatus further includes:

1) a detection unit, configured to detect, before the obtaining, by using a client of a game application, movement information of a member object participating in the current game event, the movement information of the target object in the client of the game application; and 2) a communications unit, configured to report the movement information of the target object to a server of the game application, so that the server of the game application transmits the movement information to the first member object participating in the current game event.

Still using an MOBA game application installed on a mobile terminal as an example for description, the movement information of the target object is detected in the client of the game application and is reported to the server of the game application. After receiving the movement information reported by all clients, the server of the game application collects the movement information and transmits the collected movement information to the clients of the game application of the member objects participating in the current game event. After receiving the movement information transmitted by the server, the clients of the game application update maps.

In this embodiment, the movement information of the target object is detected in the client of the game application, and the movement information of the target object is reported to the server of the game application, so that the server of the game application transmits the movement information to the member objects participating in the current game event, thereby being capable of displaying the movement information of all the member objects for a member object participating in the current game event, so as to improve user experience.

Figure 8:
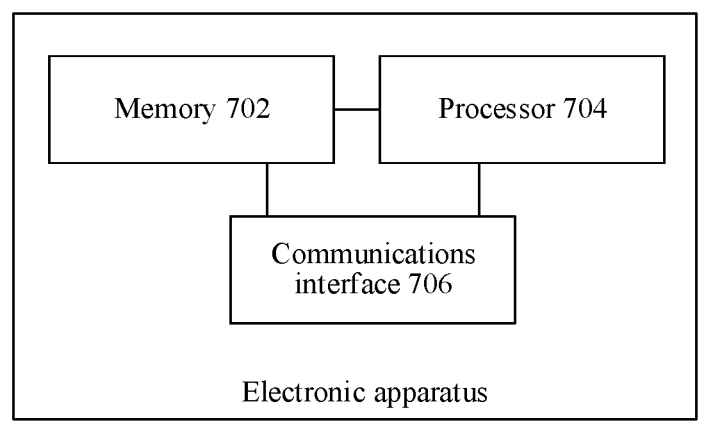
FIG. 8 is a schematic structural diagram of an optional electronic apparatus according to an embodiment of this application.

According to this embodiment of this application, an electronic apparatus configured to implement the foregoing object display method is further provided. As shown in FIG. 8, the electronic apparatus includes a memory 702, a processor 704, and a computer program stored on the memory and capable of being run on the processor, and in addition, further includes: a communications interface 706. The memory 702 is connected to the processor 704 through the communications interface 706, and the processor 704 executes, by using the computer program, the following method:

S1. Obtain, by using a client of a game application, first target movement information of a first member object participating in a current game event, where the first member object includes at least one other object that is in the same camp as a target object, the target object is an object used by the client of the game application in the current game event, and the first target movement information includes at least a moving direction of the first member object.

S2. Display, in the client of the game application, the first target movement information of the first member object.

Optionally, for a specific example in this embodiment, refer to the examples described in the foregoing embodiment 1 and embodiment 2, and details are not described herein in this embodiment again.

This embodiment of this application further provides a storage medium. Optionally, in this embodiment, the foregoing storage medium stores a program, and code executed when the program is run includes the following steps:

S1. Obtain, by using a client of a game application, movement information of member objects participating in a current game event, where the first member object includes at least one other object that is in the same camp as a target object, the target object is an object used by the client of the game application in the current game event, and the first target movement information includes at least a moving direction of the first member object.

S2. Display, in the client of the game application, the first target movement information of the first member object.

Optionally, in this embodiment, the storage medium may be configured to store program code used for executing the following steps:

S1. Display the first target movement information of the target object in a first display mode.

S2. Display the first target movement information of the another object among the first member objects in a second display mode, where display markers of the first display mode and the second display mode are different.

Optionally, in this embodiment, the storage medium may be configured to store program code used for executing the following steps:

S1. Obtain, by using the client of the game application, movement information of member objects participating in the current game event, where the member objects include a first member object and a second member object, and the first member object and the second member object are opposing objects in the current game event.

S2. Obtain, from the movement information, first target movement information matching the first member object.

Optionally, the first target movement information further includes a coordinate location of the first member object. The storage medium is configured to store program code used to perform the following steps:

displaying, in the client of the game application, a map corresponding to the current game event; and displaying, according to the coordinate location of the first member object, a first avatar ID of the first member object on the map, where a location of the first avatar ID on the map corresponds to a location of the first member object in a game scene corresponding to the map, and the first avatar ID is configured with a first direction marker indicating the moving direction of the first member object.

Optionally, in this embodiment, the storage medium may be configured to store program code used for executing the following steps:

obtaining permission information configured for the target object in the current game event; obtaining, in a case in which the permission information indicates that the target object possesses a first permission, second target movement information matching at least one second member object, where the second target movement information includes at least a moving direction of the second member object; and displaying, in the client of the game application, the second target movement information of the second member object.

Optionally, in this embodiment, the second target movement information further includes a coordinate location of the second member object, and the storage medium is configured to store program code used for executing the following steps:

S1. Display, in the client of the game application, a map corresponding to the current game event; and S2. Display, according to the coordinate location of the second member object, a first avatar ID of the first member object on the map, where a location of the first avatar ID on the map corresponds to a location of the first member object in a game scene corresponding to the map, and the first avatar ID is configured with a first direction marker indicating the moving direction of the first member object.

Optionally, in this embodiment, the storage medium may be configured to store program code used for executing the following steps:

detecting, in the client of the game application, movement information of the target object; and reporting the movement information of the target object to a server of the game application, so that the server of the game application transmits the movement information to the first member object participating in the current game event.

Optionally, in this embodiment, the storage medium may include, but is not limited to, various media such as a USB flash drive, a Read-Only Memory (ROM), a Random Access Memory (RAM), a removable hard disk, a magnetic disk, and an optical disc that can store the program code.

Optionally, for a specific example in this embodiment, refer to the examples described in the foregoing embodiment 1 and embodiment 2, and details are not described herein in this embodiment again.

The sequence numbers of the foregoing embodiments of this application are merely for the convenience of description, and do not imply the preference among the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of this application, or the part contributing to the related art, or all or some of the technical solutions may essentially be presented in the form of a software product. The computer software product is stored in the storage medium, and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software functional unit.

The foregoing descriptions are exemplary implementations of this application. A person of ordinary skill in the art may make some improvements and modifications without departing from the principle of this application and such improvements and modifications fall within the protection scope of this application.

What is claimed is:

1. An object display method performed at a computing device having one or more processors and memory storing a plurality of programs to be executed by the one or more processors, the method comprising:

obtaining, by using a client of a game application, first target movement information of a first member object of a first camp participating in a current game event, the first camp including at least one other object and a target object, the target object being an object used by the client of the game application in the current game event, and the first target movement information comprising at least a moving direction of the first member object;

displaying, in the client of the game application, the first target movement information of the first member object;

obtaining permission information configured for the target object in the current game event; and obtaining, in a case in which the permission information indicates that the target object possesses a first permission, second target movement information matching at least one second member object, wherein the second target movement information comprises at least a moving direction of the second member object, wherein the second target movement information further comprises a coordinate location of the second member object, and the displaying, in the client of the game application, the second target movement information of the second member object comprises:
- displaying, in the client of the game application, a map corresponding to the current game event; and
- displaying, according to the coordinate location of the second member object, a second avatar ID of the second member object on the map, wherein a location of the second avatar ID on the map corresponds to a location of the second member object in a game scene corresponding to the map, the second avatar ID is configured with a second direction marker indicating the moving direction of the second member object, and a display time of the second direction marker in the current game event is shorter than a predefined threshold; and
- displaying, in the client of the game application, the second target movement information of the second member object, wherein the client of the game application does not control the second member object.

2. The method according to claim 1, wherein the first member object further comprises the target object, and the displaying, in the client of the game application, the first target movement information of the first member object comprises:
- displaying the first target movement information of the target object in a first display mode and displaying the first target movement information of the another object among the first member objects in a second display mode, wherein
- display markers of the first display mode and the second display mode are different.

3. The method according to claim 1, wherein the obtaining, by using a client of a game application, first target movement information of a first member object participating in a current game event comprises:
- obtaining, by using the client of the game application, movement information of member objects participating in the current game event, wherein the member objects comprise the first member object and a second member object, and the first member object and the second member object are opposing objects in the current game event; and
- obtaining, from the movement information, first target movement information matching the first member object.

4. The method according to claim 3, wherein the obtaining, from the movement information, first target movement information matching the first member object comprises:
- obtaining an object ID of the first member object; and
- identifying, according to the object ID, the first target movement information matching the first member object from the movement information.

5. The method according to claim 1, wherein the first target movement information further comprises a coordinate location of the first member object, and the displaying, in the client of the game application, the first target movement information of the first member object comprises:
- displaying, in the client of the game application, a map corresponding to the current game event; and
- displaying, according to the coordinate location of the first member object, a first avatar ID of the first member object on the map, wherein a location of the first avatar ID on the map corresponds to a location of the first member object in a game scene corresponding to the map, and the first avatar ID is configured with a first direction marker indicating the moving direction of the first member object.

6. The method according to claim 1, further comprising:
- before obtaining, by using a client of a game application, first target movement information of a first member object participating in a current game event:
  - detecting, in the client of the game application, movement information of the target object; and
  - reporting the movement information of the target object to a server of the game application, so that the server of the game application transmits the movement information to the first member object participating in the current game event.

7. A computing device comprising one or more processors, memory coupled to the one or more processors and a plurality of programs stored in the memory that, when executed by the one or more processors, cause the computing device to perform a plurality of operations comprising:
- obtaining, by using a client of a game application, first target movement information of a first member object of a first camp participating in a current game event, the first camp including at least one other object that is in the same camp and a target object, the target object being an object used by the client of the game application in the current game event, and the first target movement information comprising at least a moving direction of the first member object;
- displaying, in the client of the game application, the first target movement information of the first member object;
- obtaining permission information configured for the target object in the current game event; and obtaining, in a case in which the permission information indicates that the target object possesses a first permission, second target movement information matching at least one second member object, wherein the second target movement information comprises at least a moving direction of the second member object, wherein the second target movement information further comprises a coordinate location of the second member object, and the displaying, in the client of the game application, the second target movement information of the second member object comprises:
  - displaying, in the client of the game application, a map corresponding to the current game event; and
  - displaying, according to the coordinate location of the second member object, a second avatar ID of the second member object on the map, wherein a location of the second avatar ID on the map corresponds to a location of the second member object in a game scene corresponding to the map, the second avatar ID is configured with a second direction marker indicating the moving direction of the second member object, and a display time of the second direction marker in the current game event is shorter than a predefined threshold; and
- displaying, in the client of the game application, the second target movement information of the second member object, wherein the client of the game application does not control the second member object.

8. The computing device according to claim 7, wherein the first member object further comprises the target object, and the displaying, in the client of the game application, the first target movement information of the first member object comprises:

displaying the first target movement information of the target object in a first display mode and displaying the first target movement information of the another object among the first member objects in a second display mode, wherein display markers of the first display mode and the second display mode are different.

9. The computing device according to claim 7, wherein the obtaining, by using a client of a game application, first target movement information of a first member object participating in a current game event comprises:

obtaining, by using the client of the game application, movement information of member objects participating in the current game event, wherein the member objects comprise the first member object and a second member object, and the first member object and the second member object are opposing objects in the current game event; and obtaining, from the movement information, first target movement information matching the first member object.

10. The computing device according to claim 9, wherein the obtaining, from the movement information, first target movement information matching the first member object comprises:

obtaining an object ID of the first member object; and
identifying, according to the object ID, the first target movement information matching the first member object from the movement information.

11. The computing device according to claim 7, wherein the first target movement information further comprises a coordinate location of the first member object; and the displaying, in the client of the game application, the first target movement information of the first member object comprises:

displaying, in the client of the game application, a map corresponding to the current game event; and
displaying, according to the coordinate location of the first member object, a first avatar ID of the first member object on the map, wherein a location of the first avatar ID on the map corresponds to a location of the first member object in a game scene corresponding to the map, and the first avatar ID is configured with a first direction marker indicating the moving direction of the first member object.

12. The computing device according to claim 7, wherein the plurality of operations further comprise:

before obtaining, by using a client of a game application, first target movement information of a first member object participating in a current game event:
detecting, in the client of the game application, movement information of the target object; and
reporting the movement information of the target object to a server of the game application, so that the server of the game application transmits the movement information to the first member object participating in the current game event.

13. A non-transitory computer readable storage medium storing a plurality of machine readable instructions in connection with a computing device having one or more processors, wherein the plurality of machine readable instructions, when executed by the one or more processors, cause the computing device to perform a plurality of operations including:

obtaining, by using a client of a game application, first target movement information of a first member object of a first camp participating in a current game event, the first camp including at least one other object and a target object, the target object being an object used by the client of the game application in the current game event, and the first target movement information comprising at least a moving direction of the first member object;

displaying, in the client of the game application, the first target movement information of the first member object;

obtaining permission information configured for the target object in the current game event; and obtaining, in a case in which the permission information indicates that the target object possesses a first permission, second target movement information matching at least one second member object, wherein the second target movement information comprises at least a moving direction of the second member object, wherein the second target movement information further comprises a coordinate location of the second member object, and the displaying, in the client of the game application, the second target movement information of the second member object comprises:

displaying, in the client of the game application, a map corresponding to the current game event; and
displaying, according to the coordinate location of the second member object, a second avatar ID of the second member object on the map, wherein a location of the second avatar ID on the map corresponds to a location of the second member object in a game scene corresponding to the map, the second avatar ID is configured with a second direction marker indicating the moving direction of the second member object, and a display time of the second direction marker in the current game event is shorter than a predefined threshold; and displaying, in the client of the game application, the second target movement information of the second member object, wherein the client of the game application does not control the second member object.

14. The non-transitory computer readable storage medium according to claim 13, wherein the first member object further comprises the target object, and the displaying, in the client of the game application, the first target movement information of the first member object comprises:

displaying the first target movement information of the target object in a first display mode and displaying the first target movement information of the another object among the first member objects in a second display mode, wherein display markers of the first display mode and the second display mode are different.

15. The non-transitory computer readable storage medium according to claim 13, wherein the obtaining, by using a client of a game application, first target movement information of a first member object participating in a current game event comprises:

obtaining, by using the client of the game application, movement information of member objects participating in the current game event, wherein the member objects comprise the first member object and a second member object, and the first member object and the second member object are opposing objects in the current game event; and obtaining, from the movement information, first target movement information matching the first member object.

16. The non-transitory computer readable storage medium according to claim 13, wherein the first target movement information further comprises a coordinate location of the first member object; and the displaying, in the client of the game application, the first target movement information of the first member object comprises:
- displaying, in the client of the game application, a map corresponding to the current game event; and
- displaying, according to the coordinate location of the first member object, a first avatar ID of the first member object on the map, wherein a location of the first avatar ID on the map corresponds to a location of the first member object in a game scene corresponding to the map, and the first avatar ID is configured with a first direction marker indicating the moving direction of the first member object.

17. The non-transitory computer readable storage medium according to claim 13, wherein the plurality of operations further comprise:
- before obtaining, by using a client of a game application, first target movement information of a first member object participating in a current game event:
  - detecting, in the client of the game application, movement information of the target object; and
  - reporting the movement information of the target object to a server of the game application, so that the server of the game application transmits the movement information to the first member object participating in the current game event.

\* \* \* \* \*